April 15, 1930.    W. H. OSBORN    1,754,963
PRESSURE GAUGE
Filed Dec. 2, 1927
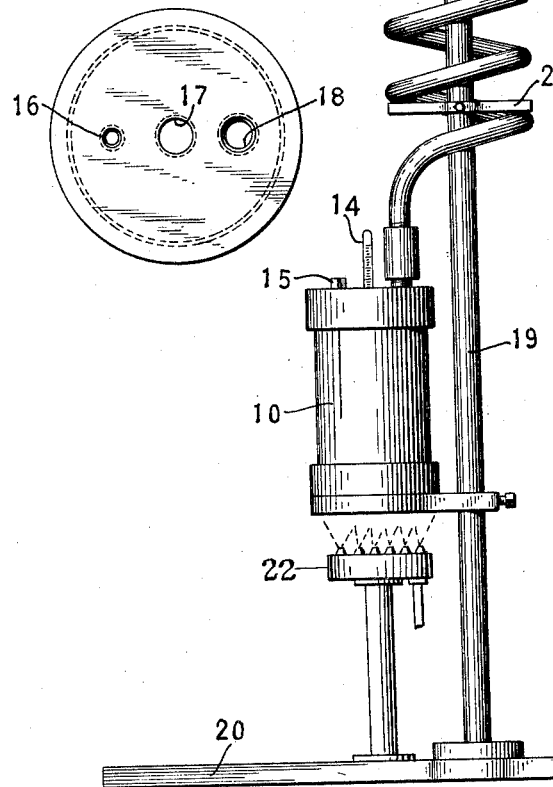
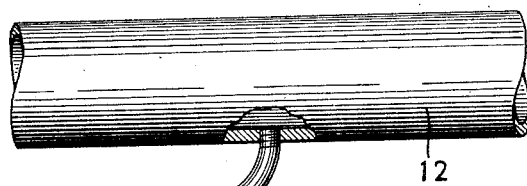
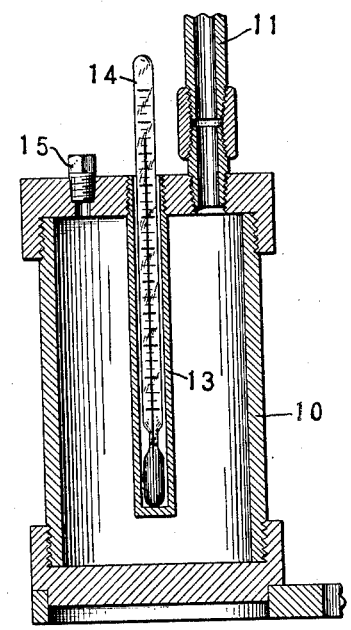

Patented Apr. 15, 1930

1,754,963

UNITED STATES PATENT OFFICE

WILLIAM HENRY OSBORN, OF HARRISON, NEW YORK

PRESSURE GAUGE

Application filed December 2, 1927. Serial No. 237,157.

This invention relates to the measurement of gas pressure by a temperature responsive indicator and has for its object to increase the accuracy of such measurement. Another object is to make the temperature responsive indicator independent of the temperature of the gas whose pressure is to be measured.

The advantages in accuracy of using a thermometer to indicate pressure have been appreciated especially the accuracy in such measurement of small pressure differences over a wide range. For example, it has been suggested to insert a thermometer in a steam pipe and read the pressures either directly from the thermometer or from tables, but such a proposal is incapable of accurate pressure measurement if the steam be superheated. Also such suggestions have been incapable of application to the pressure measurement of gases other than steam and having relatively low liquefaction points, or in other words, superheated gases in general. This invention overcomes these disadvantages and enables a thermometer to measure gas pressures at any temperature regardless of whether the gas under pressure is superheated or not.

According to this invention a boiler is connected with a vessel containing the gas whose pressure is to be measured, by a condenser so that the temperature of the boiler may be independent of the temperature of the gas under pressure in said vessel. Preferably the condenser is air cooled and arranged for gravity return or condensate to the boiler so as to automatically maintain the liquid level therein without the necessity of using some means for regulating such liquid level.

Referring to the drawing:

Fig. 1 shows a preferred embodiment of this invention;

Fig. 2 is a section through the boiler; and

Fig. 3 is a top plan view of the boiler with the connections removed.

A boiler 10 is connected by a helical pipe 11 with a gas main or other vessel 12 containing the gas whose pressure is to be measured. As illustrated, the boiler 10 is of the simplest construction comprising a short section of pipe having threaded ends capped to form the top and bottom. The pipe 11 is preferably of copper and long enough so that air cooling is sufficient to condense any boiler vapors. Having the condensing worm 11 arranged above the boiler permits gravity return of condensate to the boiler. Any convenient type of heating means will suffice such as a Bunsen burner 22 beneath the boiler, or an electric heating coil around the boiler might be used. In either case it may be desirable to heat insulate as much of the boiler as is possible although, as illustrated, such heat insulation has not been shown. Depending from the top of the boiler by the threaded connection illustrated is a tube 13 closed at its lower end and extending down and into the liquid within the boiler. A thermometer 14 is arranged in the tube 13 as shown and should be close fitting especially around the top of the boiler so as to keep outside air from getting into the tube 13. If desired, a little packing may be used around the thermometer at about the level of the top of the boiler. The tube 13 enables the thermometer to measure liquid temperatures within the boiler and yet does not cause the thermometer to be subjected to the pressures inside the boiler. The thermometer may be graduated in degrees, or it may be calibrated to read pressures directly, or to read both temperatures and pressures. A cap 15 enables the boiler to be supplied with liquid. In Fig. 3 is illustrated the top plan view of a boiler with the pipe 11 and cap 15 removed and also with the thermometer tube 13 removed. This shows that the threaded aperture 16 receives the cap 15, the tube 13 being threaded in the opening 17 and the condenser connected in the opening 18. For convenience in mounting a standard 19 rising from any suitable type base 20 adjustably supports the boiler and worm as illustrated, there being suitable spacing fins 21 extending between convolutions of the pipe 11 as shown.

In operation, the boiler is less than completely filled with liquid and sufficient heat applied to cause ebullition within the boiler under the pressure in the vessel 12. The thermometer indicates the temperature of the boiling liquid. Vapors coming from the boiler can only pass out through the pipe 11. The exposed surface of pipe 11 is sufficient to condense these vapors and the arrangement such that the condensate runs back into the boiler thus automatically maintaining the liquid level substantially constant. Inasmuch as the vapors from the boiler need not reach the vessel 12 the thermometric indicator 14 may thus indicate gas pressure within vessel 12 regardless of the temperature in vessel 12 since the condensing worm keeps the boiler and vessel 12 substantially independent of one another thermally. The lay-out pictured is adapted for measuring the pressures of any type of gas.

By the term "gas under pressure," used in the appended claims, is meant absolute pressure and not necessarily only pressures above the atmosphere. The term "gas" is intended to cover not only superheated vapors which act as perfect gases but also saturated vapors. By the term "thermometer" is meant any appropriate temperature indicator whether of the mercury type or other well known types.

I claim:

1. The method of operating a heat responsive indicator for measuring gas pressures at temperatures independent of the temperature actuating said indicator, which comprises connecting a boiler containing a liquid with the vessel containing the gas whose pressure is to be measured, boiling the liquid within said boiler under said pressure, and condensing the boiler vapors between the boiler and the vessel containing the gas whose pressure is to be measured.

2. The method of operating a temperature responsive indicator for measurement of gas pressures which comprises connecting a boiler with a vessel containing the gas pressure to be measured, operating said boiler under said pressure, and condensing substantially all the vapors from said boiler under said pressure before they reach said vessel.

In testimony whereof I affix my signature.

WILLIAM HENRY OSBORN.